(12) United States Patent
Ikegaya et al.

(10) Patent No.: US 7,472,924 B2
(45) Date of Patent: Jan. 6, 2009

(54) STEERING COLUMN DEVICE FOR VEHICLE

(75) Inventors: Isao Ikegaya, Kosai (JP); Hiroyoshi Tanai, Kosai (JP)

(73) Assignee: Fuji Kiko Co., Ltd. (JP)

( * ) Notice: Subject to any disclaimer, the term of this patent is extended or adjusted under 35 U.S.C. 154(b) by 366 days.

(21) Appl. No.: 11/385,240

(22) Filed: Mar. 20, 2006

(65) Prior Publication Data

US 2006/0214411 A1 Sep. 28, 2006

(30) Foreign Application Priority Data

Mar. 28, 2005 (JP) ............... P2005-092486
Aug. 29, 2005 (JP) ............... P2005-248026

(51) Int. Cl.
*B62D 1/11* (2006.01)
*B62D 1/16* (2006.01)
*B62D 1/18* (2006.01)

(52) U.S. Cl. ............... 280/777; 74/492; 74/493

(58) Field of Classification Search ......... 280/777; 74/492, 493

See application file for complete search history.

(56) References Cited

U.S. PATENT DOCUMENTS

| | | | |
|---|---|---|---|
| 6,578,872 B2 | 6/2003 | Duval et al. | |
| 6,641,167 B2 * | 11/2003 | Riefe et al. | 280/777 |
| 6,764,098 B2 * | 7/2004 | Matsumoto et al. | 280/777 |
| 7,188,867 B2 * | 3/2007 | Gatti et al. | 280/777 |
| 7,222,878 B2 * | 5/2007 | Imamura et al. | 280/731 |
| 7,229,096 B2 * | 6/2007 | Manwaring et al. | 280/777 |
| 7,300,071 B2 * | 11/2007 | Lee | 280/777 |
| 7,325,834 B2 * | 2/2008 | Manwaring et al. | 280/777 |
| 7,422,239 B2 * | 9/2008 | Ishibashi et al. | 280/777 |
| 2003/0102658 A1 | 6/2003 | McCarthy et al. | |
| 2004/0232685 A1 | 11/2004 | Gatti et al. | |
| 2008/0100050 A1 * | 5/2008 | Menjak et al. | 280/777 |

FOREIGN PATENT DOCUMENTS

| | | |
|---|---|---|
| EP | 1094240 | 10/2000 |
| JP | 10-217981 | 8/1998 |
| JP | 2002-120732 | 4/2002 |
| JP | 2004-299489 | 10/2004 |
| WO | WO03035449 | 1/2003 |

* cited by examiner

*Primary Examiner*—John Q. Nguyen
*Assistant Examiner*—Joselynn Y. Sliteris
(74) *Attorney, Agent, or Firm*—Kilpatrick Stockton LLP (57) ABSTRACT

A steering column device for a vehicle which includes: a steering column jacket; a detachable bracket detachably attached to an attachment bracket for supporting the steering column jacket; a tearable first energy absorbing member having one end fixed to the attachment bracket and the other end fixed to the detachable bracket; a tearable second energy absorbing member having one end fixed to the detachable bracket and the other end engageable with the attachment bracket; and an engaging device for engagement between the second energy absorbing member and the attachment bracket. The engaging device leaves the second energy absorbing member unengaged with the attachment bracket under a low-impact load condition, and has the second energy absorbing member engaged with the attachment bracket under a high-impact load condition.

6 Claims, 11 Drawing Sheets

STEERING COLUMN DEVICE FOR VEHICLE

BACKGROUND OF THE INVENTION

1. Field of Invention

The present invention relates to a steering column device for a vehicle for absorbing a part of an impact energy exerted to a vehicle body upon collision of the vehicle as well as the impact energy exerted to a steering wheel by a driver. More particularly, the present invention relates to a steering column device for a vehicle having a variable energy absorption capability, which is capable of changing an amount of the energy to be absorbed in two stages in accordance with an operation state of the driver.

2. Description of Related Art

A generally employed steering column device for a vehicle is structured such that a steering column itself contracts or collapses in an axial direction thereof or the steering column is detached from the vehicle body to move forward as safety measures for the driver upon collision of the vehicle.

The steering column device for a vehicle as disclosed in JP-A-10-217981 is structured such that the steering column is detached from the vehicle body to move forward thereof upon the collision. The aforementioned relative movement serves to tear a metal plate formed as an energy absorbing member for absorbing a part of the impact energy.

SUMMARY OF THE INVENTION

In the steering column device as described above, if impact loads exerted to the vehicle body upon the vehicle collision and to the steering wheel by the driver are lower than a predetermined set value, the axial contraction of the steering column or the action for tearing the energy absorbing member cannot be started, thus failing to sufficiently absorb the impact energy. If the driver is lightweight, for example, a woman, her safety cannot be sufficiently ensured because of the condition where the impact load exerted to the steering wheel by such driver fails to reach the set value depending on the level of the impact caused by the vehicle collision.

In consideration with the aforementioned problem, it is an object of the invention to provide a steering column device for a vehicle, which is structured to absorb a part of the impact energy exerted to the vehicle body and the impact energy exerted to the steering wheel by the driver upon the vehicle collision in two stages. The steering column device is capable of absorbing the impact energy irrespective of the driver's weight, and the degree of collision so as to constantly secure the driver's safety.

An aspect of the present invention is a steering column device for a vehicle comprising: a steering column jacket to which an impact load is exerted; a detachable bracket that is detachably attached to a part of a vehicle body for supporting the steering column jacket; a tearable first energy absorbing member having one end fixed to the part of the vehicle body and the other end fixed to the detachable bracket; a tearable second energy absorbing member having one end fixed to the part of the vehicle body and the other end engageable with the detachable bracket; and an engaging device for having the other end of the second energy absorbing member engaged with the detachable bracket, wherein the engaging device leaves the other end of the second energy absorbing member unengaged with the detachable bracket under a low-impact load condition, and has the other end of the second energy absorbing member engaged with the detachable bracket under a high-impact load condition where the impact load is greater than that of the low-impact load condition.

BRIEF DESCRIPTION OF THE DRAWINGS

The invention will now be described with reference to the accompanying drawings wherein.

DETAILED DESCRIPTION OF THE PREFERRED EMBODIMENT

Embodiment of the present invention will be explained below with reference to the drawings, wherein like members are designated by like reference characters.

First Embodiment

Figure 1:
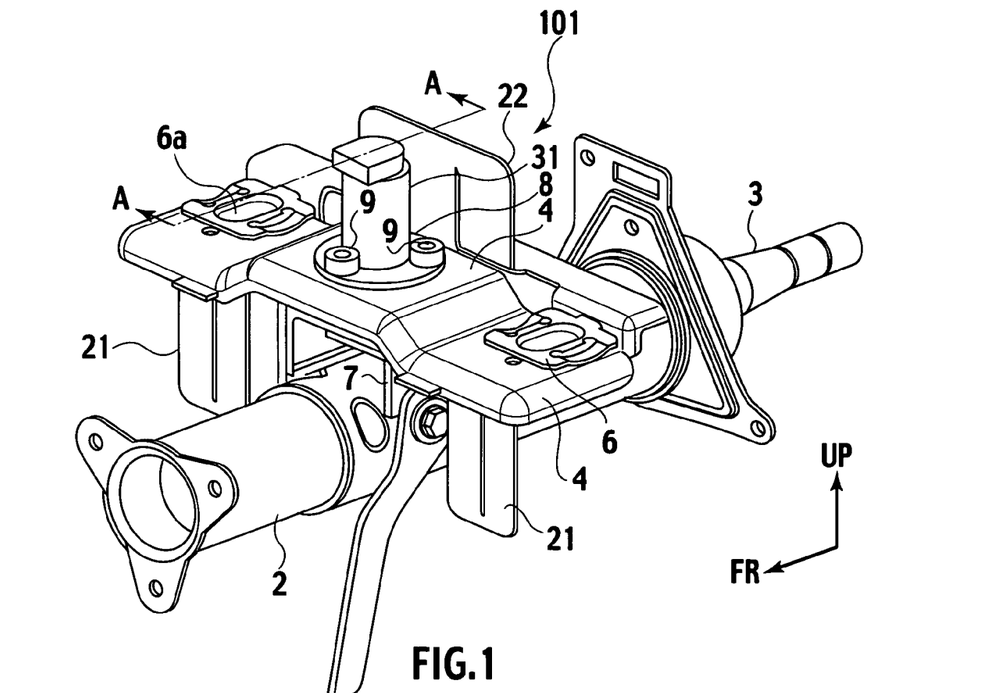
FIG. 1 is a perspective view of a steering column device for a vehicle according to a first embodiment of the invention.

Referring to FIG. 1, a steering column device 101 for a vehicle includes a cylindrical steering column jacket 2 having a steering shaft 3 inserted therein. One end (upper end) of the steering shaft 3 is fixed to a steering wheel (not shown).

Figure 3:
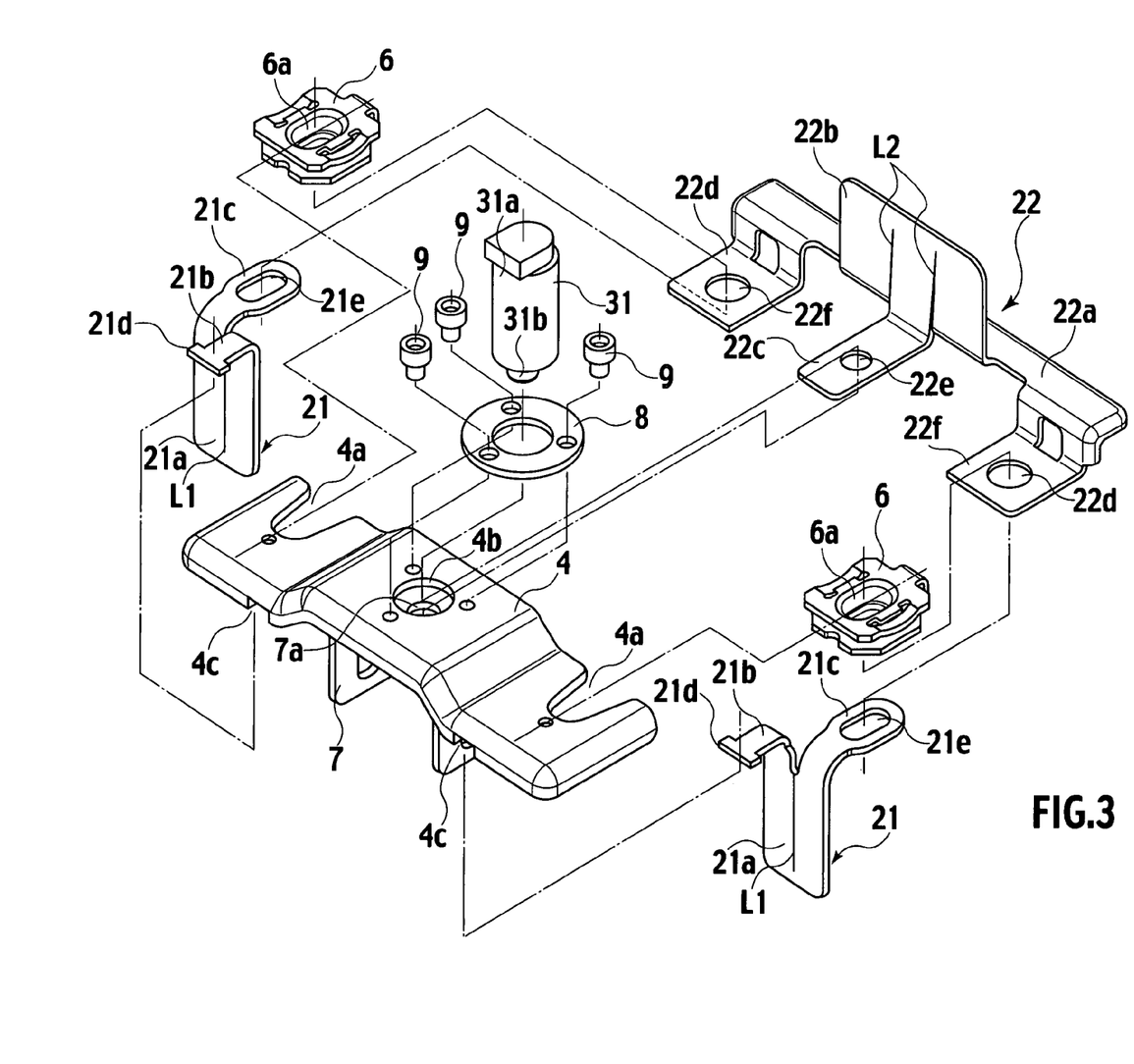
FIG. 3 is an exploded perspective view of the steering column device shown in FIG. 1.

The steering column jacket 2 is attached to a part of a vehicle body with a detachable bracket 4 formed of a steel plate. Substantially V-shaped slits 4a each opened to the rear of the vehicle body are formed at left and right sides of the detachable bracket 4 as shown in FIG. 3. A slide plate 6 having a U-shape in the side view is fit in each of the slits 4a of the detachable brackets 4. The slide plate 6 is attached to the part of the vehicle body with a bolt (not shown) that pierces through a slotted bolt hole 6a formed in the slide plate 6.

Figure 2:
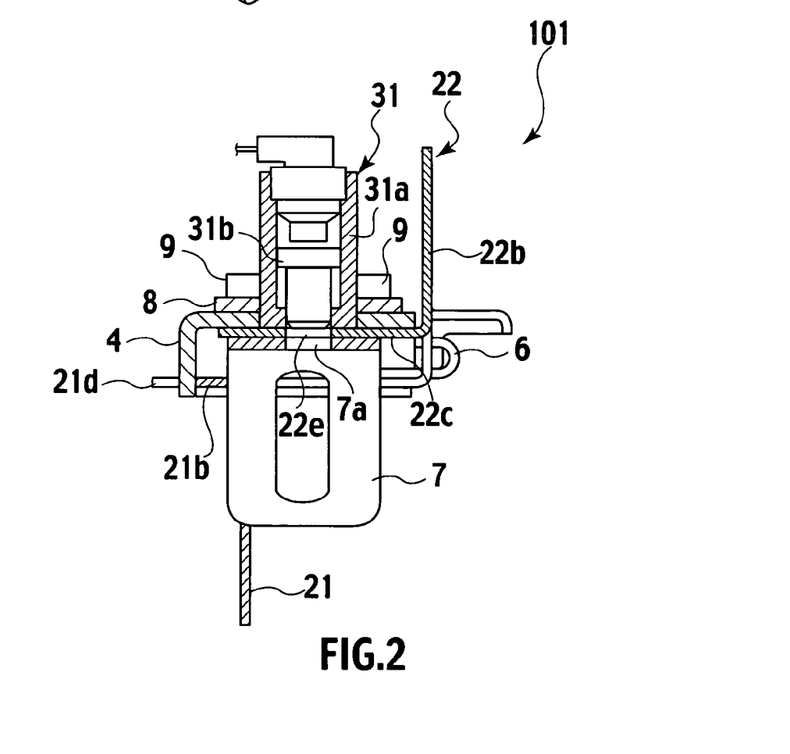
FIG. 2 is a sectional side elevation taken along line A-A of the steering column device shown in FIG. 1.

A center portion of the detachable bracket 4 in a width direction is elevated. The lower surface of the elevated portion is fixed to a channel-like support bracket 7 for supporting the steering column jacket 2. A hole 4b is formed in the elevated center portion of the detachable bracket 4 in the width direction, in other words, a portion right above the steering column jacket 2 within a width of the steering column jacket 2 as shown in FIG. 3. A pyro-actuator 31 serving as an engaging device is fit in the hole 4b with three screws 9 via a ring-shaped washer 8 perpendicularly (such that an axis of the pyro-actuator 31 becomes perpendicular to the axial direction of the steering column). The pyro-actuator 31 has a piston 31b set in a cylinder 31a to be movable up and down as shown in FIG. 2. A circular insertion hole 7a is formed in the upper portion of the support bracket 7. The insertion hole 7a opens to the hole 4b of the detachable bracket 4.

Referring to FIG. 3, a rectangular notch 4c is formed in each front end of left and right sides of the detachable bracket 4.

First energy absorbing members 21 formed of steel plates are provided, between which the steering column jacket 2 under the detachable bracket 4 is interposed. A second energy absorbing member 22 formed of a steel plate is provided at the center of the detachable bracket 4 in its width direction.

Each of the first energy absorbing members 21 has support portions 21b, 21c formed by orthogonally bending a top portion of a plate-like main body 21a at right angles that perpendicularly extends forward and rearward, respectively. A front end of the support portion 21b has an engaging portion 21d having a width larger than that of the support portion 21b. The support portion 21c has a slotted bolt hole 21e formed therein. A tear line L1 that perpendicularly extends downward from the boundary between the support portions 21b and 21c is preliminarily cut on the main body 21a.

The second energy absorbing member 22 includes a rectangular plate-like main body 22b that stands perpendicularly to the center of a wide stay 22a in its width direction, a support portion 22c formed by bending a lower end of the main body 22b at a right angle to extend horizontally forward, and support portions 22d formed by bending each of left and right ends of the stay 22a at right angles to extend horizontally forward. The center support portion 22c has a circular engagement hole 22e, and each of the support portions 22d has a circular bolt hole 22f, respectively. The main body 22b has two tear lines L2 each preliminarily cut, which extend perpendicularly upward from both edges of the center support portion 22c. Those tear lines L1, L2 are formed of continuous or non-continuous notches each having a substantially V-shaped cross-section.

The other support portion (rear end portion) 21c of the first energy absorbing member 21 and left and right support portions 22d of the second energy absorbing member 22 are fixed to a part of the vehicle body together with the slide plates 6 with bolts (not shown) inserted through the bolt holes 21e, 22f for fixing the slide plate 6 to a part of the vehicle body. The other support portion (front end portion) 21b of the first energy absorbing member 21 is fixed to the detachable bracket 4 through an engagement of the engagement portion 21d formed at its front end with the corresponding notch 4c formed at the left or right front end of the detachable bracket 4.

Referring to FIG. 2, the support portion 22c at the center of the second energy absorbing member 22 is inserted into a space between the detachable bracket 4 and the support bracket 7 from behind. The engagement hole 22e formed in the support portion 22c is communicated with the engagement hole 7a formed in the support bracket 7.

An ECU (Electronic Control Unit) executes an ignition control for ON/OFF control of the pyro-actuator 31.

The ECU is connected to various sensors for detecting vehicle operation states, for example, a seat position sensor, a sensor for detecting a driver's weight, a vehicle speed sensor, an occupant position sensor, a sensor for detecting whether the occupant wears the seat belt, and a collision detection sensor for detecting an impact exerted to a steering wheel so as to receive various signals from those sensors. Based on the received signals, the ECU applies electric current to the pyro-actuator 31 so as to execute the ON/OFF control of the pyro-actuator 31. The collision detection sensor may be employed together with the aforementioned sensors for detecting the vehicle operation states for the purpose of improving the detection accuracy.

Operations of the steering column device 101 for a vehicle having the aforementioned structure in two cases, that is, a low-impact load condition and a high-impact load condition will be described referring to FIGS. 4A, 4B, 5A, and 5B, respectively.

Figure 4A:
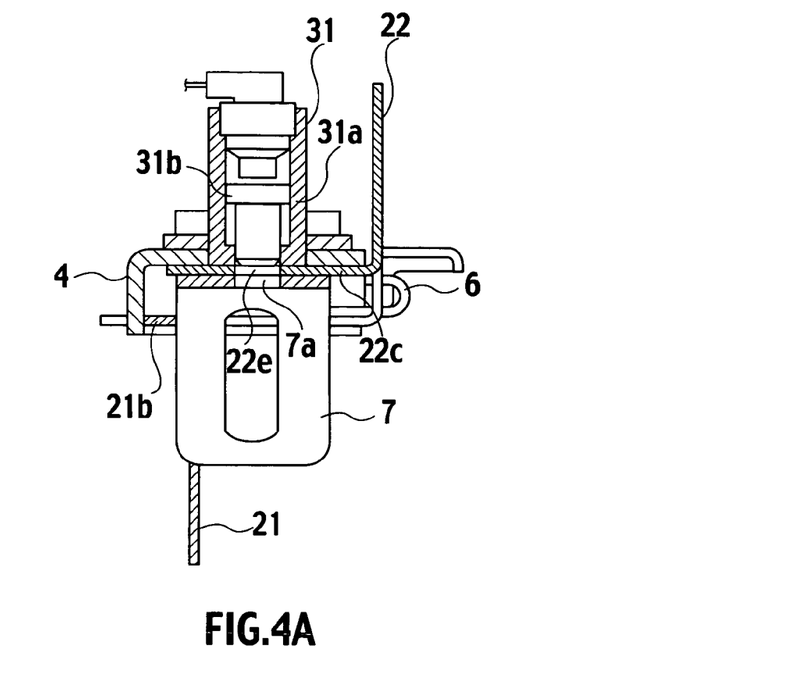
FIG. 4A is a sectional side elevation taken along line A-A of the steering column device shown in FIG. 1 in the state prior to a collision.

Referring to FIG. 4A, in the state prior to the vehicle collision, the pyro-actuator 31 is in OFF state. A piston 31b of the pyro-actuator 31 is kept within a cylinder 31a and is not yet fit in engagement holes 22e, 7a formed in the second energy absorbing member 22 and the support bracket 7, respectively. Accordingly the support portion 22c at the center of the second energy absorbing member 22 is not connected to the detachable bracket 4 (support bracket 7).

Figure 4B:
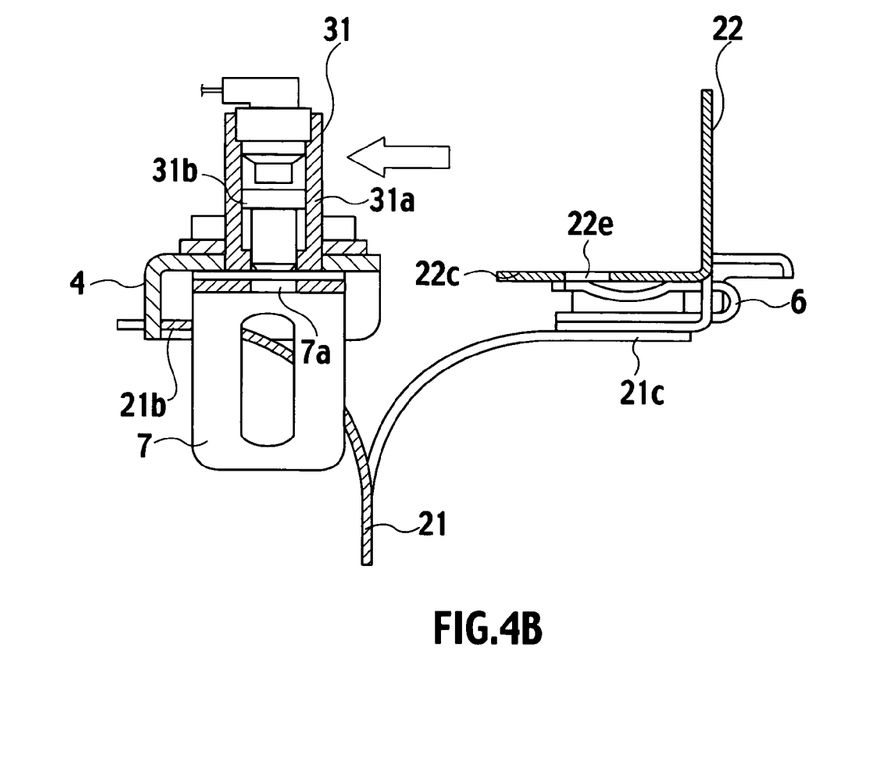
FIG. 4B is a sectional side elevation taken along line A-A of the steering column device shown in FIG. 1 in the state after a low-impact collision.

In the deceleration state caused by the vehicle collision, at the low load condition where the degree of the impact to the vehicle body is relatively low, for example, the driver is lightweight, the impact load exerted to the steering wheel by the driver is relatively low because of small deceleration rate or the like, the pyro-actuator 31 is kept in OFF state such that the detachable bracket 4 is kept unengaged with the second energy absorbing member 22. Referring to FIG. 4B, the detachable bracket 4 is detached from the vehicle body to move forward together with the pyro-actuator 31. Then each of the left and right first energy absorbing members 21 having the support portion 21b engaged with the detachable bracket 4 is torn apart along the tear line L1. Meanwhile the second energy absorbing member 22 is held at the vehicle body side. A relatively small degree of energy is consumed for tearing the left and right first energy absorbing members 21 so as to absorb the impact energy, thus ensuring the driver's safety under the low-impact load condition.

Figure 5A:
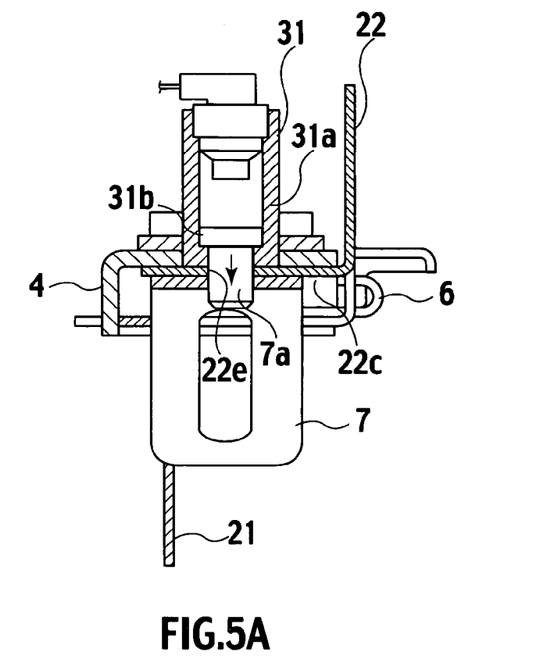
FIG. 5A is a sectional side elevation taken along line A-A of the steering column device shown in FIG. 1 in the state immediately after a high-impact load collision.

Under the high-impact load condition where the driver is heavily weighted, and the impact load exerted to the steering wheel by the driver is relatively high because of relatively large deceleration rate, the pyro-actuator 31 is brought into ON state. The burst of the explosive forces the piston 31b to move downward along the cylinder 31a such that the lower end thereof is fit in the engagement holes 22e, 7a formed in the second energy absorbing member 22 and the support bracket 7, respectively as shown in FIG. 5A. Accordingly the support portion 22c at the center of the second energy absorbing member 22 is connected to the detachable bracket 4 (support bracket 7).

Figure 5B:
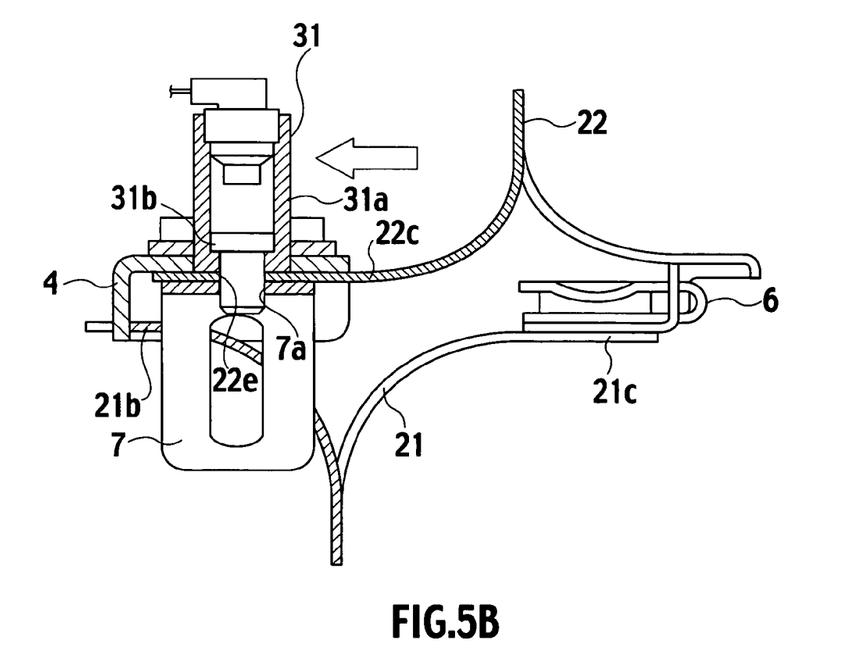
FIG. 5B is a sectional side elevation taken along line A-A of the steering column device shown in FIG. 1 in the state where an energy absorbing member is torn apart after the high-impact load collision.

Referring to FIG. 5B, the detachable bracket 4 is detached from the vehicle body to move forward such that both the left and right first energy absorbing members 21 and the second energy absorbing member 22 are torn apart along the tear lines L1, L2, respectively. Under the high-impact load condition, the second energy absorbing member 22 is torn apart as well as the left and right first energy absorbing members 21. A relatively large degree of energy is consumed for tearing those first and second energy absorbing members so as to absorb the relatively high impact energy, thus ensuring the driver's safety under the high-impact load condition.

In the first embodiment, a part of the impact energy exerted to the vehicle body, or the impact energy exerted to the steering wheel by the driver upon the vehicle collision may be absorbed in two stages depending on the degree of the impact. This makes it possible to ensure the driver's safety by reliably absorbing the impact energy irrespective of the driver's weight or the degree of the collision.

Second Embodiment

A second embodiment of the present invention will be described.

Figure 6:
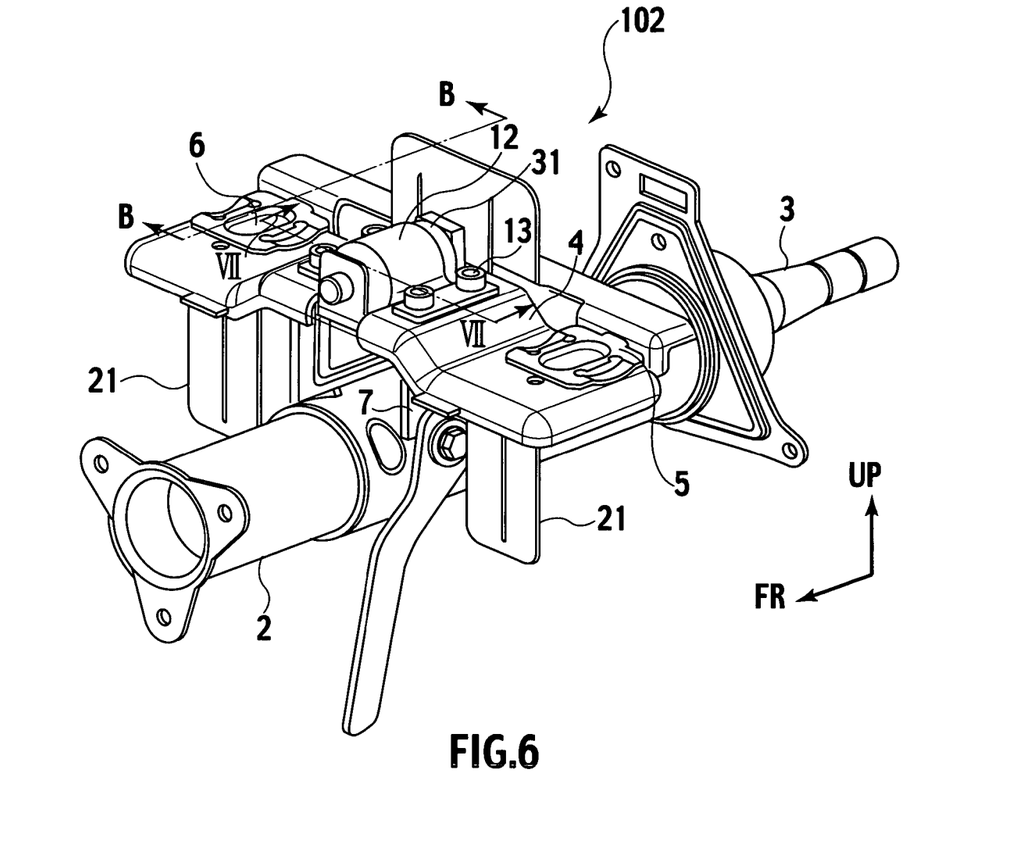
FIG. 6 is a perspective view of a steering column device for a vehicle according to a second embodiment of the invention.
Figure 7:
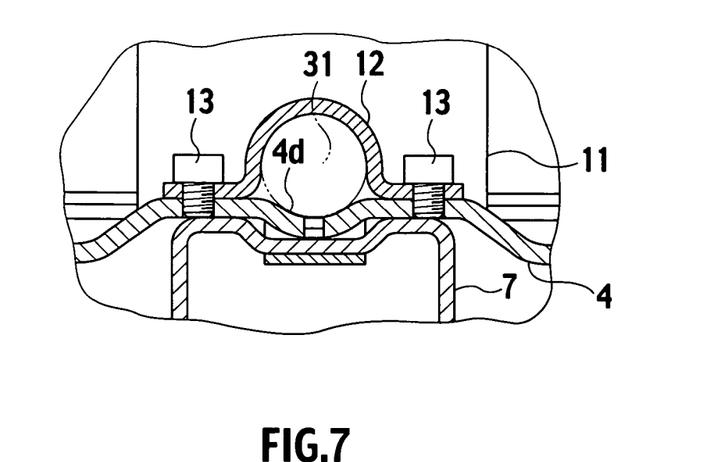
FIG. 7 is a partially sectional front view taken along line VII-VII of a fixation portion of a pyro-actuator of the steering column device shown in FIG. 6.
Figure 8:
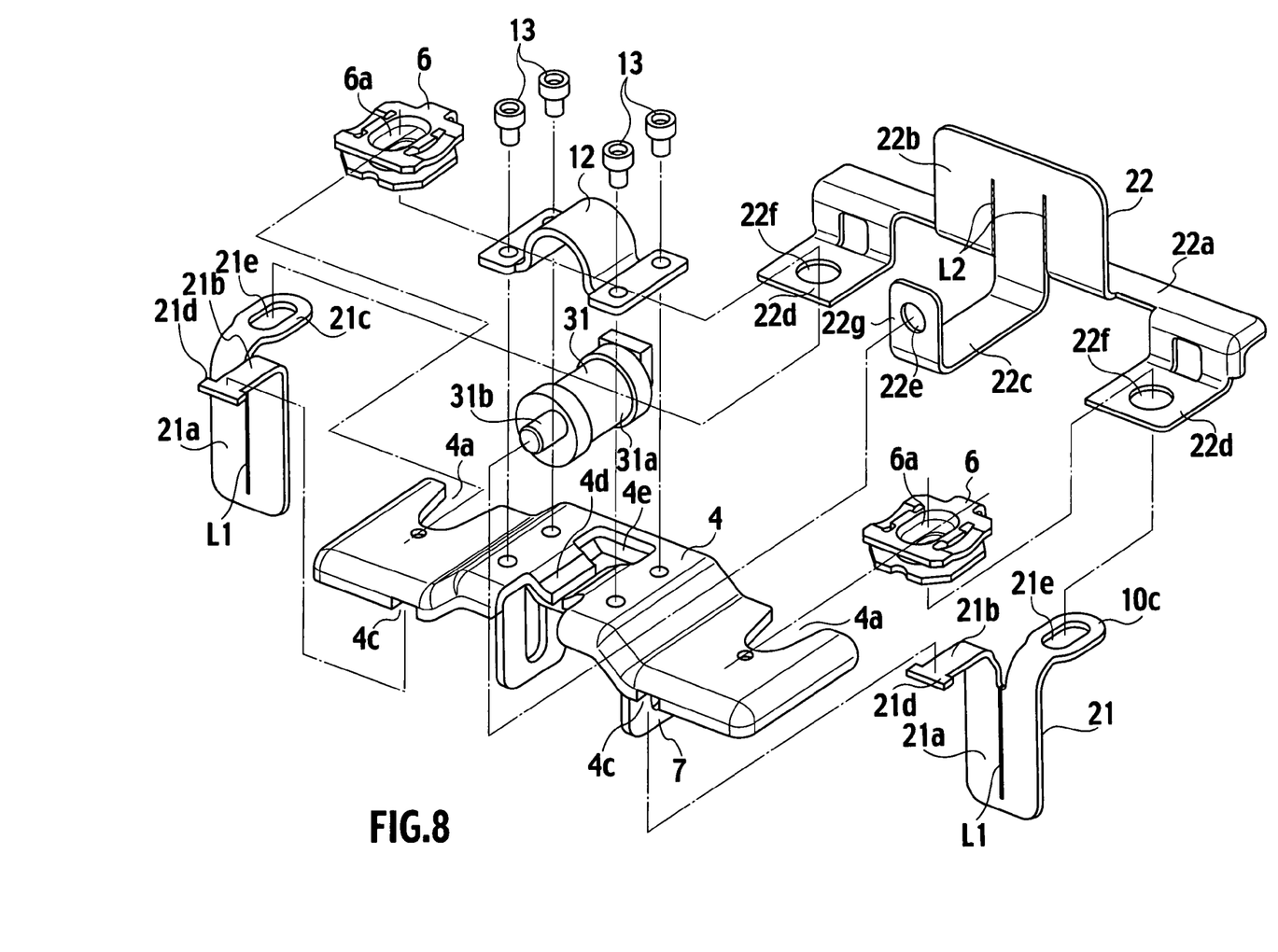
FIG. 8 is an exploded perspective view of the steering column device shown in FIG. 6.

FIG. 6 is a perspective view of a steering column device for a vehicle according to a second embodiment of the present invention. FIG. 7 is a partially sectional front view of a fixed portion of the pyro-actuator of the steering column device. FIG. 8 is an exploded perspective view of the steering column device. The elements shown in those drawings which are the same as those shown in FIGS. 1 to 3 will be designated with the same reference numerals. The explanations of those elements, thus, will be omitted.

In the second embodiment, the pyro-actuator 31 is arranged such that its axis is in parallel with the axial direction of the steering column. Other structural features of the embodiment are the same as those of the first embodiment.

Referring to FIGS. 7 and 8, in a steering column device 102 for a vehicle according to the second embodiment of the present invention, an elevated portion at the center of the detachable bracket 4 in its width direction has a recess portion 4d extending in the direction perpendicular to the width direction and having a cylindrical surface along the outline of the lateral side of the pyro-actuator 31. Rectangular notches 4e are formed at the front and rear ends of the recess portion 4d.

Both ends of the pyro-actuator 31 in its axial direction have projected portions to be fit in the respective notches 4e formed in the detachable bracket 4. The intermediate portion of the pyro-actuator 31 is rested in the recess portion 4d of the detachable bracket 4, and a fixation bracket 12 shaped like a bearing cup is placed on the intermediate portion such that left and right points of the fixation brackets 12 are fixed to the detachable bracket 4 using screws 13. The pyro-actuator 31, thus, is interposed and fixed between the fixation bracket 12 and the detachable bracket 4. In this way, the pyro-actuator 31 can be reliably fixed on the detachable bracket 4 in parallel with the axial direction of the steering column so as to restrain the movement of the pyro-actuator 31 in the axial direction and the rotational direction. The pyro-actuator 31 is provided in parallel with the axial direction of the steering column so as to form a relatively large space thereabove.

In the second embodiment, the leading end of the support portion 22c at the center of the second energy absorbing member 22 in its width direction is bent at a right angle to form a vertical portion 22g having a circular engagement hole 22e through which a piston 31b of the pyro-actuator 31 is inserted or removed.

Figure 9A:
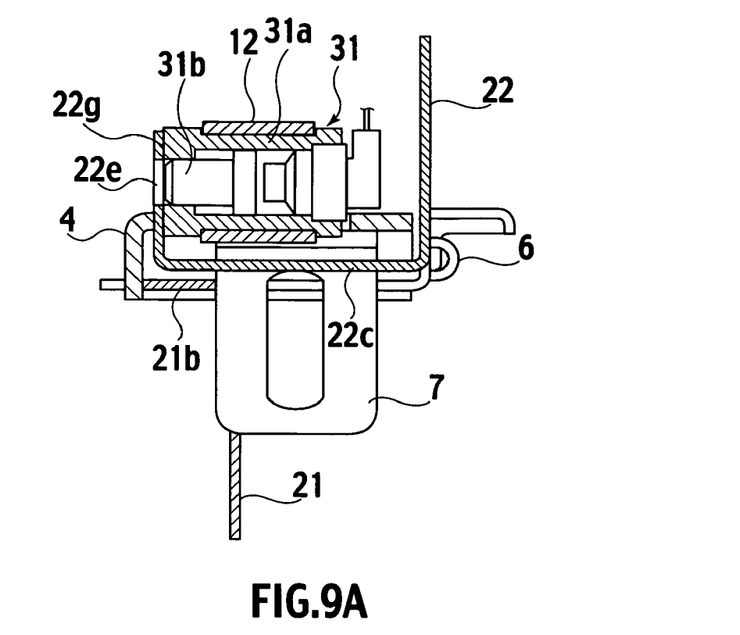
FIG. 9A is a sectional side elevation taken along line B-B of the steering column device shown in FIG. 6 in the state prior to a collision.
Figure 9B:
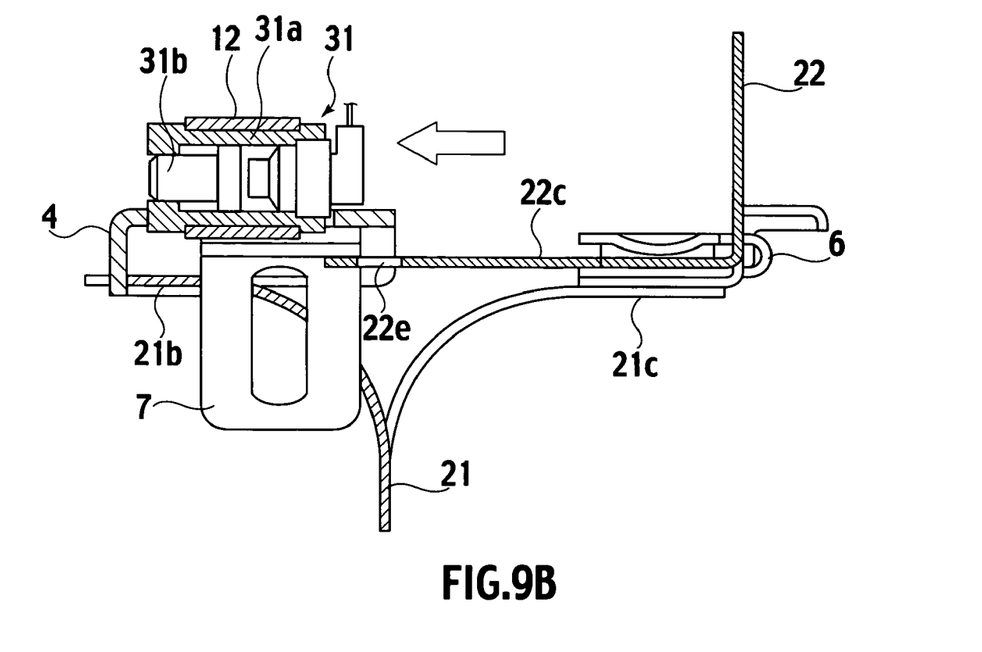
FIG. 9B is a sectional side elevation taken along line B-B of the steering column device shown in FIG. 6 in the state after a low-impact load collision.
Figure 10A:
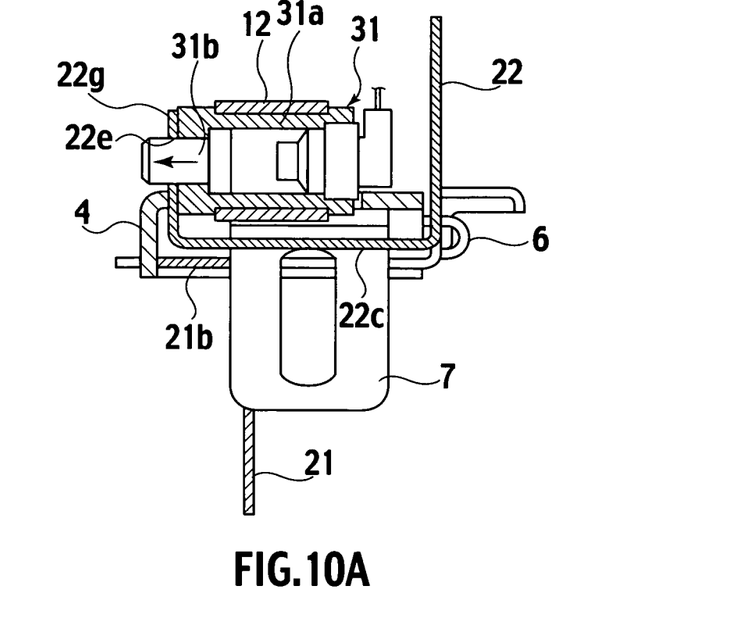
FIG. 10A is a sectional side elevation taken along line B-B of the steering column device shown in FIG. 6 in the state immediately after a high-impact load collision.
Figure 10B:
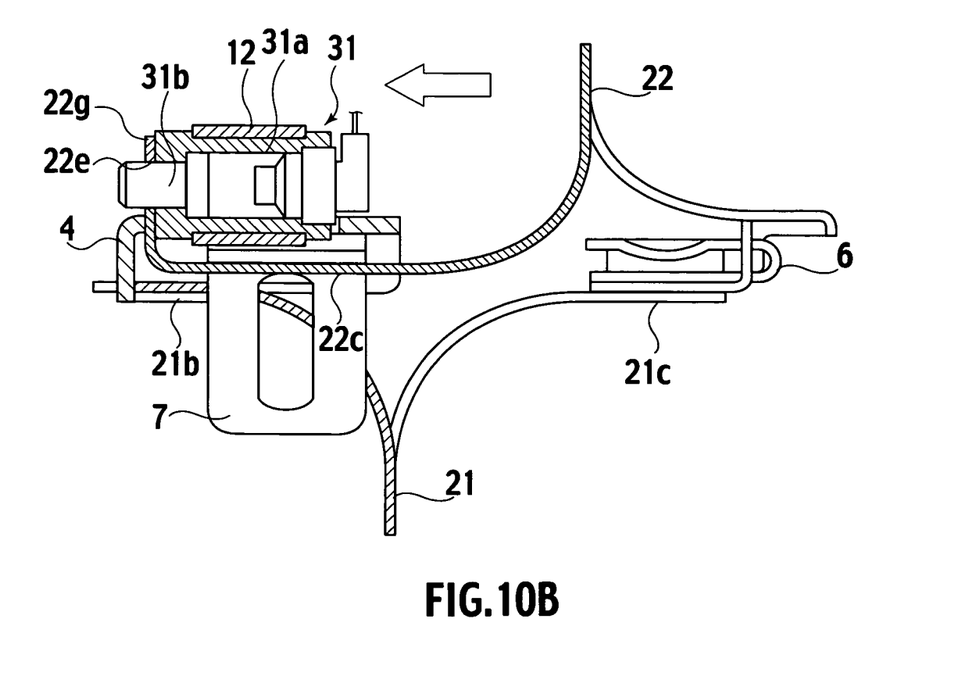
FIG. 10B is a sectional side elevation taken along line B-B of the steering column device shown in FIG. 6 in the state where an energy absorbing member is torn apart after the high-impact load collision.

Operations of the steering column device 102 for a vehicle according to the embodiment both under the low-impact load condition and the high-impact load condition will be described referring to FIGS. 9A, 9B and 10A, 10B, respectively. FIGS. 9A to 10B show side elevations in the respective operation states. More specifically, FIG. 9A shows the operation state prior to the collision. FIG. 9B shows the operation state after the collision at the low load. FIG. 10A shows the operation state immediately after the collision at the high load. FIG. 10B shows the operation state after the collision at the high load where the energy absorbing member is torn apart.

Referring to FIG. 9A, in the state prior to the collision of the vehicle, the pyro-actuator 31 is in OFF state. The piston 31b is kept within the cylinder 31a and is not fit in the engagement hole 22e formed in the vertical portion 22g of the support portion 22c of the second energy absorbing member 22. Accordingly the support portion 22c at the center of the second energy absorbing member 22 is not connected to the detachable bracket 4.

Under the low-impact load condition upon the vehicle collision where the degree of the impact to the vehicle body is relatively low, the driver is lightweight, and the impact load exerted to the steering wheel by the driver is relatively low, the pyro-actuator 31 is kept in OFF state such that the detachable bracket 4 is detached from the vehicle body as shown in FIG. 9B and moves forward together with the pyro-actuator 31. The detachable bracket 4 rolls the vertical portion 22g formed at the support portion 22c at the center of the second energy absorbing member 22 into flat while tearing the left and right first energy absorbing members 21 each having a support portion 21b engaged with the detachable bracket 4 along the tear line L1. Meanwhile the second energy absorbing member 22 is held at the vehicle body side. A relatively small degree of energy is consumed for tearing the left and right first energy absorbing members 21 and rolling the vertical portion 22g of the second energy absorbing member 22 so as to absorb the impact energy, thus ensuring the driver's safety at the low load state.

Under the high-impact load condition where the degree of the impact to the vehicle body is relatively large, and the driver is heavily weighted to exert the relatively high impact load to the steering wheel, the pyro-actuator 31 is brought into ON state. Referring to FIG. 10A, the piston 31b is forced to move forward along the cylinder 31a such that the front end thereof is fit in the engagement hole 22e of the support portion 22c of the second energy absorbing member 22. Accordingly the support portion 22c of the second energy absorbing member 22 is connected to the detachable bracket 4.

As shown in FIG. 10B, the detachable bracket 4 is detached from the vehicle body to move forward such that the left and right first energy absorbing members 21 and the second energy absorbing member 22 connected to the detachable bracket 4 are torn apart along the respective tear lines L1 and L2. Under the high-impact load condition, the second energy absorbing member 22 is torn apart as well as the left and right first energy absorbing members 21. A relatively large degree of energy is consumed for tearing those members so as to absorb the relatively higher impact energy, thus ensuring the driver's safety under the high-impact load condition.

Like the first embodiment, the second embodiment is structured to absorb a part of the impact energy exerted to the vehicle body upon the vehicle collision and the impact energy exerted to the steering wheel by the driver in two stages in accordance with the degree of the impact. This makes it possible to ensure the driver's safety by reliably absorbing the impact energy irrespective of the driver's weight and the degree of the impact.

The aforementioned embodiment is structured to absorb the impact energy exerted to the vehicle body and the impact energy exerted to the steering wheel by the driver in two stages in accordance with the degree of the impact. The present invention is not limited to the above-described structure. It may be structured to absorb the impact energy in two stages based on data signals indicating the driver's operation state from the seat position sensor, the weight sensor for detecting the driver's weight, the vehicle speed sensor, the occupant position sensor, the sensor for detecting whether the occupant wears the seat belt, and the like.

Third Embodiment

Figure 11:
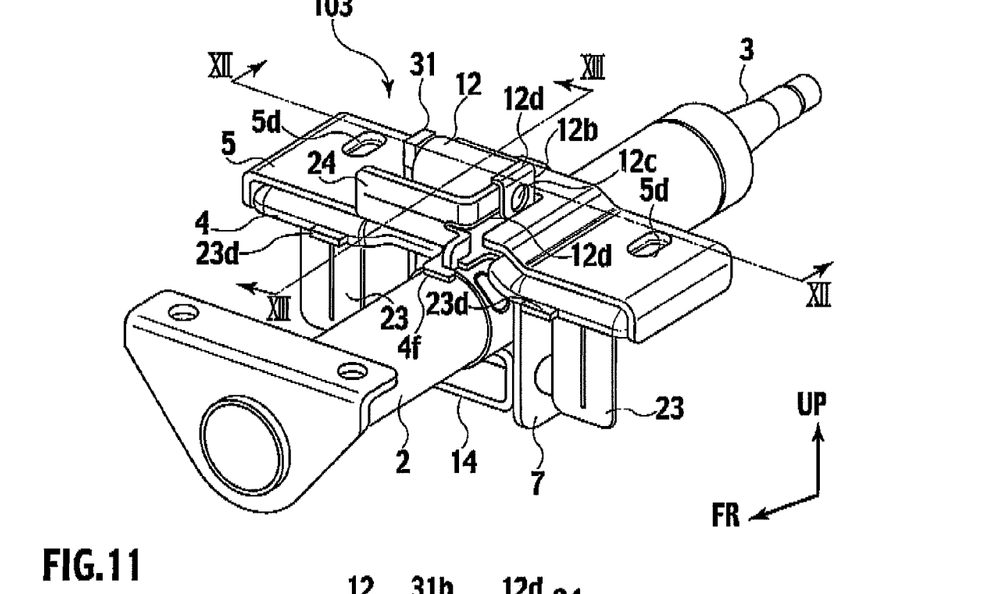
FIG. 11 is a perspective view of a steering column device for a vehicle according to a third embodiment of the invention.

A steering column device 103 shown in FIG. 11 includes a cylindrical steering column jacket 2 having a steering shaft 3 inserted therethrough. One end (upper end) of the steering shaft 3 is fixed to a steering wheel (not shown).

The steering column jacket 2 is supported with a detachable bracket 4 formed of a steel plate. Those steering column jacket 2 and the detachable bracket 4 are attached to a part of the vehicle body with a steel plate attachment bracket 5.

Figure 14:
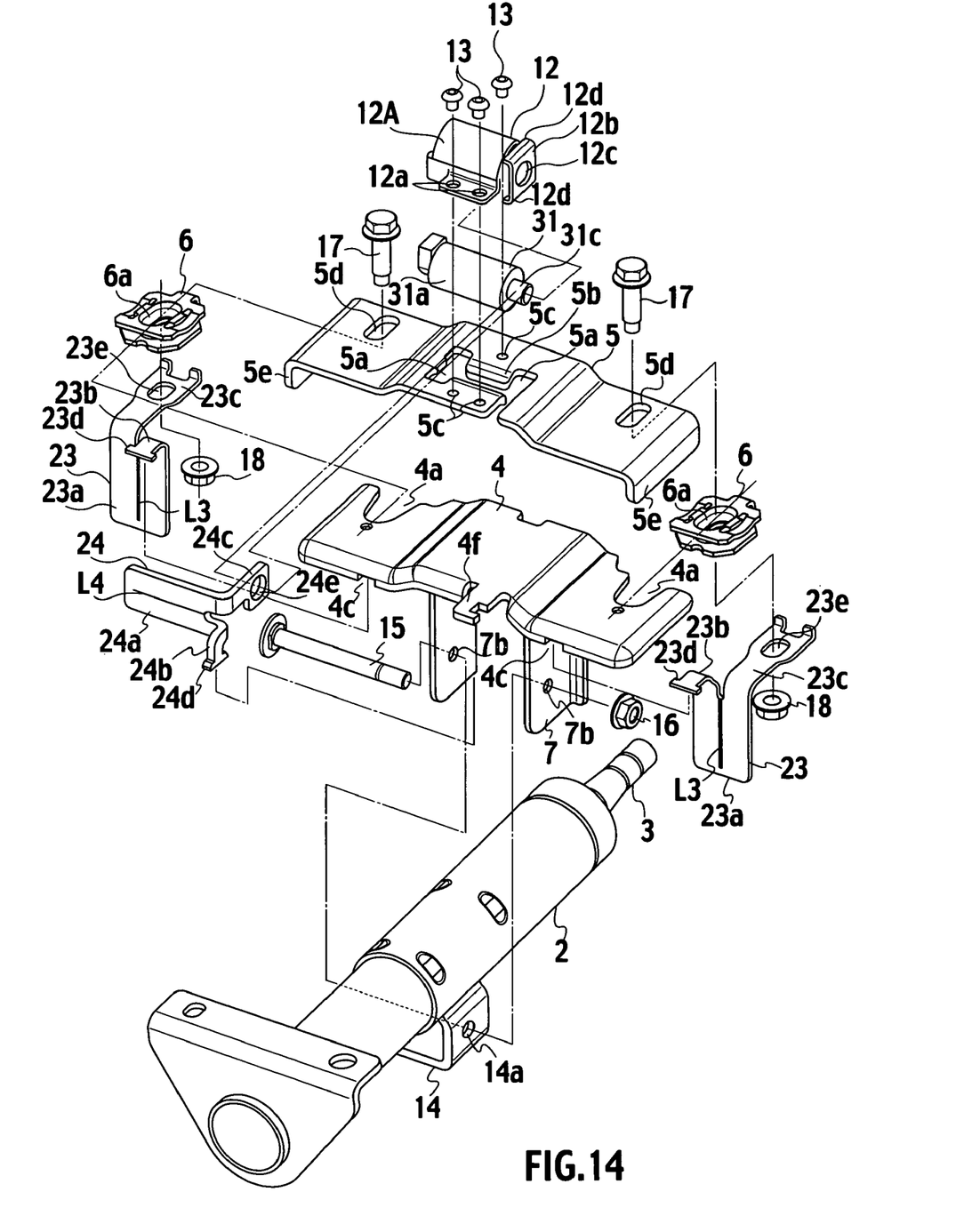
FIG. 14 is an exploded perspective view of the steering column device shown in FIG. 11.

Referring to FIG. 14, a substantially V-shaped slit 4a that opens to the rear of the vehicle body is formed in each of left and right sides of the detachable bracket 4. A slide plate 6 having a U-shape in a side view is fit in the slit 4a of the detachable bracket 4. Each of the slide plates 6 has a slotted bolt hole 6a formed therein.

The detachable bracket 4 has an upwardly elevated portion at the center thereof in the width direction. A channel-like support bracket 7 is fixed to the lower surface of the elevated portion so as to support the steering column jacket 2. As shown in FIG. 14, the lower portion of the intermediate section of the steering column jacket 2 in the axial direction is fixed to a channel-like attachment bracket 14. The steering column jacket 2 allows the attachment bracket 14 to be fit between the support brackets 7. Then bolts 15 are laterally inserted into the circular holes 7b, 14a such that each end of the bolt 15 is secured by the corresponding nut 16. The steering column jacket 2, thus, may be attached to the detachable bracket 4.

Figure 12:
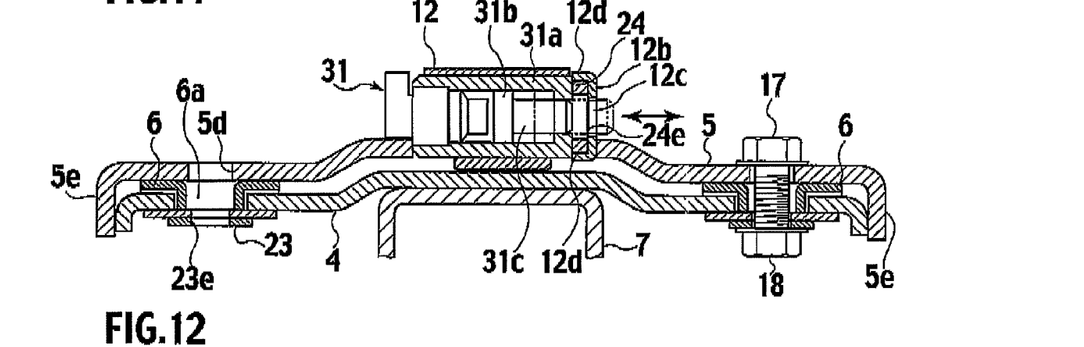
FIG. 12 is a sectional view taken along line XII-XII shown in FIG. 11.
Figure 13:
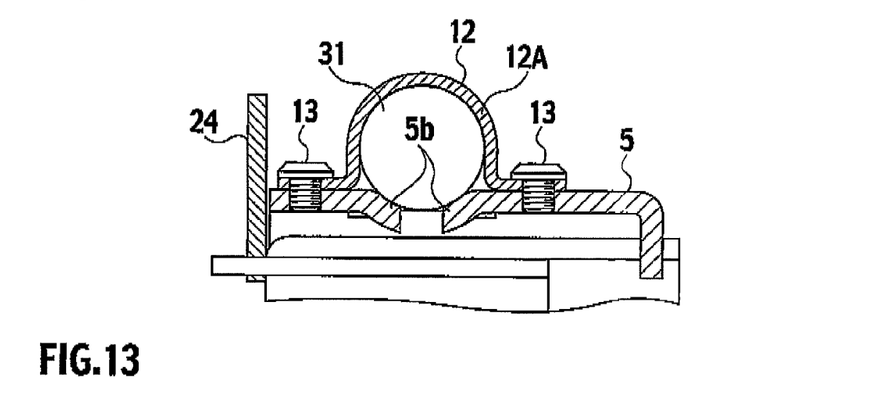
FIG. 13 is a sectional view taken along line XIII-XIII shown in FIG. 11.

A hook 4f horizontally extends forward of the vehicle from the side of the elevated portion of the detachable bracket 4 at its center in the width direction. Rectangular notches 4c are formed at front ends of the left and right sides of the detachable bracket 4. Both left and right edges of the detachable bracket 4 are bent downward at right angles as shown in FIG. 12.

Corresponding to the elevated portion of the detachable bracket 4, an upwardly elevated portion is formed on the center of the attachment bracket 5 in its width direction. Referring to FIG. 14, two rectangular holes 5a are formed in the elevated portion so as to be apart from each other. A recess portion 5b having a cylindrical surface is formed between those holes 5a as shown in FIG. 14. Three screw holes 5c are formed forward and backward of the recess portion 5b of the attachment bracket 5.

Slotted bolt holes 5d extending in the longitudinal direction are formed to the left and right sides of the elevated portion of the attachment bracket 5, and left and right side edges thereof are bent downwardly at right angles to form guide portions 5e, respectively. Referring to FIG. 12, in an assembled state of the steering column device 103, the attachment bracket 5 is placed on the top of the detachable bracket 4 to cover the detachable bracket 4. The guide portions 5e formed at the side edges of the attachment bracket 5 are formed to fit with both side edges of the detachable bracket 4 so as to guide the detachable bracket 4 upon detachment-thereof.

A pyro-actuator 31 is laterally provided on the attachment bracket 5, and fixed thereto with a semi-cylindrical fixing bracket 12 that covers the pyro-actuator 31. That is, the pyro-actuator 31 is laterally placed on the attachment bracket 5 such that its lower portion is rested in the recess portion 5b formed in the attachment bracket 5. Then the fixation bracket 12 is placed tocover the pyro-actuator 31 so that the pyro-actuator is interposed and fixed between the fixation bracket 12 and the attachment bracket 5 by screws 13 inserted through circular holes 12a formed in flanges at both sides of the fixation bracket 12 (only one flange is shown in FIG. 14) to the screw holes 5c formed in the attachment bracket 5.

Referring to FIG. 12, the pyro-actuator 31 is structured to have a piston 31b slidably moveable through the cylinder 31a. The piston 31b is provided integrally with a columnar pin 31c that extends therefrom.

Referring to FIG. 14, the fixation bracket 12 is formed of a semi-cylindrical body 12A and a plate portion 12b extending therefrom. The plate portion 12b extends in a direction perpendicular to the affachment bracket 5. A circular hole 12c having the same shape as that of a circular cross section of the pin 31c of the pyro-actuator 31 is formed at the center of the plate portion 12b The circular hole 12c constitutes a pin supporting portion for supporting the pin 31c of the pyroactuator 31. Both upper and lower ends of the plate portion 12b are inwardly bent at right angles so as to form guide portions 12d, respectively.

The guide portions 12d receive the upper and lower end sides of the support portion 24c of the second energy absorbing member 24 to be described later so as to guide the second energy absorbing member 24 while restraining its movement perpendicular to the axis of the steering column.

The first energy absorbing members 23 each formed of steel plate are provided below the detachable bracket 4 at left and right sides thereof to interpose the steering column jacket 2 therebetween. The second energy absorbing member 24 formed of steel plate is also provided at the center of the detachable bracket 4 in its width direction.

As shown in FIG. 14, the first energy absorbing member 23 includes a plate-like main body 23a and support portions 23b, 23c formed by bending upper portion of the main body 23a at right angles forward and backward, respectively. The leading end of the support portion 23b has an engagement portion 23d with an extended width. The other support portion 23c has a slotted bolt hole 23e formed therein. The main body 23a is preliminarily provided with a tear line L3 that vertically extends downward from the boundary between the support portions 23b and 23c.

As shown in FIG. 14, the second energy absorbing member 24 includes a laterally extending plate-like main body 24a, and support portions 24b, 24c formed by bending end portion of the main body 24a forward and backward, respectively. The lower end of the support portion 24b has an engagement portion 24d with an extended width. The other support portion 24c has a circular hole 24e. The main body 24a is preliminarily provided with a tear line L4 that laterally extends from the boundary between the support portions 24b and 24c.

The tear lines L3 and L4 are formed of continuous or discontinuous notches with a substantially V-shaped cross section.

Left and right slide plates 6 are fit in the left and right slits 4a of the detachable bracket 4 from behind, respectively. Referring to FIG. 12, the upper surface of the detachable bracket 4 is covered by the attachment bracket 5, and the lower surface of the detachable bracket 4 is covered with the corresponding support portion 23c of the first energy absorbing member 23. The detachable bracket 4, the steering column jacket 2 supported therewith, and the corresponding support portion 23c of the first energy absorbing member 23 are fixed to a part of the vehicle body via the attachment bracket 5 using bolts 17 that are inserted through bolt holes 5d, 6a, 23e respectively formed in the attachment bracket 5, the slide plate 6, and the first energy absorbing member 23 and nuts 18 to be screwed thereon.

The support portion 23b of the first energy absorbing member 23 is fixed to the detachable bracket 4 by bringing the engagement portion 23d formed at the front end into engagement with the notch 4c formed in the front end of each of the left and right sides of the detachable bracket 4.

The support portion 24b of the second energy absorbing member 24 is fixed to the detachable bracket 4 by bringing the engagement portion 24d formed at the lower end of the support portion 24b into engagement with the hook 4f as a protruding front end of the detachable bracket 4 in its width direction. The other support portion 24c of the second energy absorbing member 24 is inserted into the space between the main body 12A and the plate portion 12b of the fixation bracket 12. The circular hole 24e formed in the support portion 24c is communicated with the circular hole 12c formed in the plate portion 12b of the fixation bracket 12. The pin 31c is brought into engagement with or kept unengaged with the circular holes 24e and 12c in accordance with ON/OFF state of the pyro-actuator 31 to be described later. As described above, the support portion 24c of the second energy absorbing member 24 has its upper and lower ends guided by the guide portion 12d formed on the plate portion 12b of the fixation bracket 12. Accordingly the pin 31c of the pyro-actuator 31 may be accurately aligned with the circular holes 24e, 12c, thus avoiding the positional displacement.

A not shown ECU (Electronic Control Unit) executes the ignition control for ON/OFF control of the pyro-actuator.

The ECU is connected to various sensors for detecting vehicle operation states, for example, a seat position sensor, a sensor for detecting a driver's weight, a vehicle speed sensor, an occupant position sensor, a sensor for detecting whether the occupant wears the seat belt, and a collision detection sensor for detecting an impact exerted to a steering wheel so as to receive various signals from those sensors. Based on the received signals, the ECU applies electric current to the pyro-actuator 31 so as to execute the ON/OFF control of the pyro-actuator 31. The collision detection sensor may be employed together with the aforementioned sensors for detecting the vehicle operation states for the purpose of improving the detection-accuracy.

Figure 15:
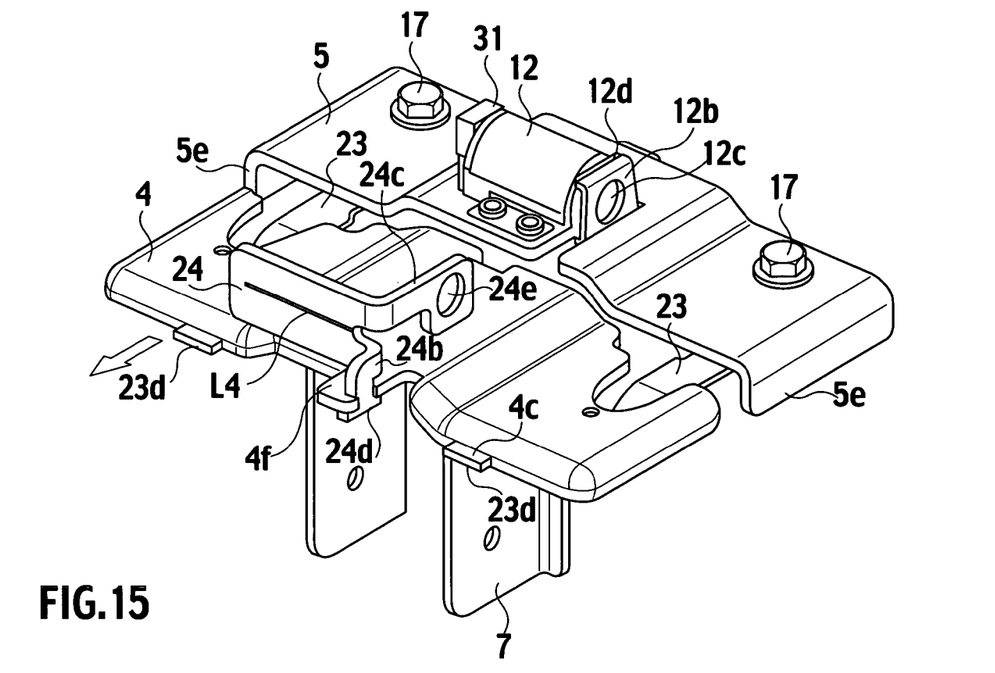
FIG. 15 is a perspective view of the steering column device in the state after a low-impact load collision.

Operations of the steering column device 103 for a vehicle having the aforementioned structure in two cases, that is, the low-impact load condition and a high-impact load condition will be described referring to FIGS. 15 and 16, respectively.

Referring to FIG. 11, in the state prior to the vehicle collision, the pyro-actuator 31 is in OFF state. The pin 31c of the pyro-actuator 31 is kept within the cylinder 31a as indicated by a solid line in FIG. 12, and is not yet fit in the circular holes 24e, 12c formed in the second energy absorbing member 24 and the fixation bracket 12. Accordingly the support portion 24c of the second energy absorbing member 24 is not connected to the attachment bracket 5.

In the deceleration state caused by the vehicle collision, under the low-impact load condition where the degree of the impact to the vehicle body is relatively low, for example, the driver is lightweight, the impact load exerted to the steering wheel by the driver is relatively low because of small deceleration rate or the like, the pyro-actuator 31 is kept in OFF state such that the attachment bracket 5 is kept unengaged with the second energy absorbing member 24. Referring to FIG. 15, the detachable bracket 4 is detached from the attachment bracket 5 to move forward together with the steering column jacket 2 (not shown in FIG. 15). Then each of the left and right first energy absorbing members 23 having the support portion 23b engaged with the detachable bracket 4 is torn apart along the tear line L3. Meanwhile the second energy absorbing member 24 is detached from the plate portion 12b of the fixation bracket 12 attached to the attachment bracket 5. The engagement portion 24d that is engaged with the hook 4f of the detachable bracket 4 is detached from the attachment bracket 5 together with the detachable bracket 4. A relatively small degree of energy is consumed for tearing the left and right first energy absorbing members 23 so as to absorb the impact energy, thus ensuring the driver's safety under the low-impact condition.

Under the high-impact load condition where the driver is heavily weighted, and the impact load exerted to the steering wheel by the driver is relatively high because of relatively large deceleration rate, the pyro-actuator 31 is brought into ON state. The burst of the explosive forces the piston 31b and pin 31c to move through the cylinder 31a as shown by the chain line such that the leading end of the pin 31c is fit in the circular holes 24e, 12c respectively formed in the second energy absorbing member 24 and the fixation bracket 12. The support portion 24c of the second energy absorbing member 24 is connected to the attachment bracket 5.

Figure 16:
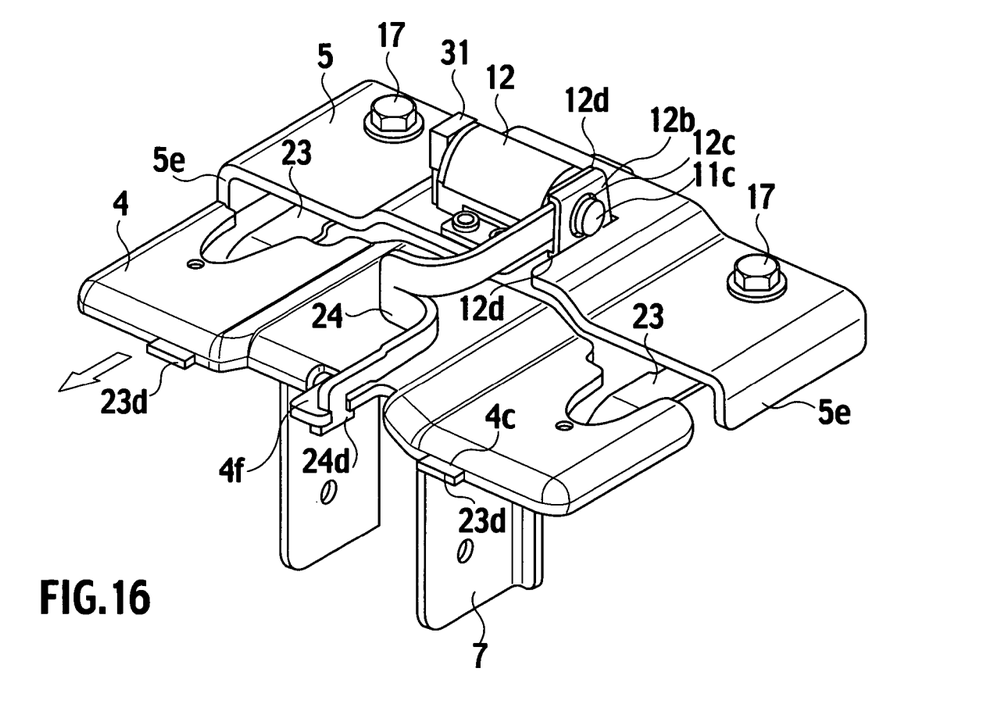
FIG. 16 is a perspective view of the steering column device in the state after a high-impact load collision.

Referring to FIG. 16, the detachable bracket 4 is detached from the attachment bracket 5 to move forward such that both the left and right first energy absorbing members 23 and the second energy absorbing member 24 are torn apart along the tear lines L3, L4, respectively. Under the high-impact load condition, the second energy absorbing member 24 is torn apart as well as the left and right first energy absorbing members 23. A relatively large degree of energy is consumed for tearing those first and second energy absorbing members so as to absorb the relatively high impact energy, thus ensuring the driver's safety under the high-impact load condition.

In the embodiment, a part of the impact energy exerted to the vehicle body, or the impact energy exerted to the steering wheel by the driver upon the vehicle collision may be absorbed in two stages depending on the degree of the impact. This makes it possible to ensure the driver's safety by reliably absorbing the impact energy irrespective of the driver's weight or the degree of the collision.

In the embodiment, the pyro-actuator 31 is fixed to the attachment bracket 5 that is expected to be held connected to the vehicle body upon the vehicle collision such that the pyro-actuator 31 stays on the attachment bracket 5 even if the steering column jacket 2 and the detachable bracket 4 are detached from the attachment bracket 5 upon the vehicle collision. This makes it possible to ensure the operation stability and improved safety of the pyro-actuator 31.

The fixation bracket 12 for fixing the pyro-actuator 31 to the attachment bracket 5 is integrally provided with the plate portion 12b, and the circular hole 12c is formed in the plate portion 12b as the pin supporting portion to support the pin 31c of the pyro-actuator 31. In the case where the pin 31c of the pyro-actuator 31 is fit in the circular hole 24e of the support portion 24c of the second energy absorbing member 24 under the high-impact load condition, the pin 31c is supported while being held in the circular hole 12c of the fixation bracket 12. The circular hole 12c serves to bear the impact load exerted to the second energy absorbing member 24, thus absorbing the impact energy by tearing the second energy absorbing member 24.

In the present embodiment, the recess portion 5b formed in the attachment bracket 5 serves to receive the lower portion of the pyro-actuator 31 which is to be interposed between the recess portion 5b and the fixation bracket 12. This makes it possible to restrain the movement of the pyro-actuator 31 in the axial and rotational directions thereof. As a result, the height of the pyro-actuator 31 at rest is kept as low as possible, and a relatively larger space is formed above the pyro-actuator 31.

As the pyro-actuator 31 is laterally provided on the attachment bracket 5, that is, laterally arranged with respect to the occupant of the vehicle, the safety is further enhanced while keeping the larger space above the pyro-actuator 31.

In the embodiments of the invention, the attachment bracket 5 is provided with the guide portion 5e for guiding the detachable bracket 4. The detachable bracket 4 detached from the attachment bracket 5 is allowed to smoothly move forward while being guided by the guide portion 5e of the attachment bracket 5. The detachable bracket 4 allows the first energy absorbing member 23 to be torn apart under the low-impact condition, and both the first and the second energy absorbing members 23, 24 to be torn apart under the high-impact load condition.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2005-092486, filed on Mar. 28, 2005, and Japanese Patent Application No. 2005-248026, filed on Aug. 29, 2005, the disclosures of which are expressly incorporated herein by reference in their entireties.

What is claimed is:

1. A steering column device for a vehicle comprising:
an attachment bracket fixed to a part of a vehicle body;
a steering column jacket to which an impact load is exerted;
a detachable bracket that is detachably attached to the attachment bracket for supporting the steering column jacket;
a tearable first energy absorbing member having one end fixed to the attachment bracket and the other end fixed to the detachable bracket;
a tearable second energy absorbing member having one end fixed to the detachable bracket and the other end engageable with the attachment bracket; and
a pyro-actuator for having the other end of the second energy absorbing member engaged with the attachment bracket, the pyro-actuator having a pin to be engaged with the other end of the second energy absorbing member, wherein the pyro-actuator leaves the other end of the second energy absorbing member unengaged with the attachment bracket under a low-impact load condition, and has the other end of the second energy absorbing member engaged with the attachment bracket, forcing the pin thereof engaged with the other end of the second energy absorbing member, under a high-impact load condition where the impact load is greater than that of the low-impact load condition; and wherein the pyro-actuator is fixed to the attachment bracket with a fixation bracket and a guide portion for guiding the other end of the second energy absorbing member and a pin support portion for supporting the pin of the pyro-actuator engaged with the other end of the second energy absorbing member.

2. The steering column device according to claim 1, wherein the fixation bracket is provided, adjacent to a main body thereof, with a plate portion having the pin support portion and the guide portion, wherein the plate portion is arranged perpendicular to the attachment bracket.

3. The steering column device according to claim 2, wherein the pin support portion of the plate portion comprises a hole having a shape same as a cross sectional shape of the pin of the pyro-actuator.

4. The steering column device according to claim 1, wherein the attachment bracket is formed to have thereon a recess portion for receiving a lower portion of the pyro-actuator so as to interpose the pyro-actuator between the recess portion and the fixation bracket.

5. The steering column device according to claim 1, wherein the pyro-actuator is arranged in a lateral direction with respect to the attachment bracket.

6. The steering column device according to claim, wherein the attachment bracket is provided with a guide portion that guides the detachable bracket being detached from the attachment bracket.

* * * * *